United States Patent
Hofmann et al.

(10) Patent No.: US 10,401,084 B2
(45) Date of Patent: Sep. 3, 2019

(54) METHOD FOR ELECTRICAL PRE-DRYING OF A CERAMIC BLANK

(71) Applicants: Lapp Insulators GmbH, Wunsiedel (DE); Simon Hofmann, Wunsiedel (DE); Michael Judge, Thierstein (DE)

(72) Inventors: Simon Hofmann, Wunsiedel (DE); Michael Judge, Thierstein (DE)

(73) Assignee: Lapp Insulators GmbH, Wunsiedel (DE)

( * ) Notice: Subject to any disclaimer, the term of this patent is extended or adjusted under 35 U.S.C. 154(b) by 737 days.

(21) Appl. No.: 14/389,375

(22) PCT Filed: Mar. 1, 2013

(86) PCT No.: PCT/EP2013/000599
§ 371 (c)(1),
(2) Date: Sep. 30, 2014

(87) PCT Pub. No.: WO2013/143644
PCT Pub. Date: Oct. 3, 2013

(65) Prior Publication Data
US 2015/0107130 A1 Apr. 23, 2015

(30) Foreign Application Priority Data
Mar. 30, 2012 (DE) .................. 10 2012 006 423

(51) Int. Cl.
| | | |
|---|---|---|
| *H05B 3/60* | (2006.01) | |
| *B28B 11/24* | (2006.01) | |
| *F26B 3/347* | (2006.01) | |
| *F26B 3/353* | (2006.01) | |

(52) U.S. Cl.
CPC ............ *F26B 3/353* (2013.01); *B28B 11/243* (2013.01); *F26B 3/347* (2013.01); *H05B 3/60* (2013.01); *F26B 2210/02* (2013.01); *Y02P 40/63* (2015.11)

(58) Field of Classification Search
CPC ...... F26B 3/353; F26B 3/347; F26B 2210/02; H05B 3/60; B28B 11/243; Y02P 40/63
See application file for complete search history.

(56) References Cited

U.S. PATENT DOCUMENTS

| | | | |
|---|---|---|---|
| 2,320,474 A | 6/1943 | Ross | |
| 4,762,428 A * | 8/1988 | Villiger | .................. G01G 23/48 |
| | | | 338/22 R |
| 2009/0294440 A1 | 12/2009 | Adrian et al. | |

FOREIGN PATENT DOCUMENTS

| | | | |
|---|---|---|---|
| CA | 878130 A | * | 8/1971 |
| DE | 532505 C | | 12/1931 |
| DE | 19714811 A1 | | 10/1998 |
| GB | 1278044 A | | 6/1972 |
| GB | 1278044 A1 | | 6/1972 |
| JP | H04144951A A1 | | 5/1992 |
| JP | H0597443A A1 | | 4/1993 |

OTHER PUBLICATIONS

English translation of International Search Report, PCT/EP20131000599, dated Aug. 16, 2013, 2 pp.
JP-Office Action dated Oct. 20, 2015.
CN-Office Action dated Dec. 25, 2015.

* cited by examiner

*Primary Examiner* — Jessica Yuen
(74) *Attorney, Agent, or Firm* — Dinicola & Young PC; Brian K. Dinicola

(57) ABSTRACT

A method for electrically predrying a moist blank of a ceramic raw mixture is provided, the blank being connected into a circuit and an alternating current being passed through the blank. In this case, the alternating current is passed through the blank at an increased frequency in comparison with the mains frequency. Significantly less electrical energy is required to achieve an identical drying result.

20 Claims, No Drawings

METHOD FOR ELECTRICAL PRE-DRYING OF A CERAMIC BLANK

FIELD OF THE INVENTION

The invention relates to a method for electrically predrying a moist blank of a ceramic raw mixture, the blank being connected into a circuit and an alternating current being passed through the blank. Such a method is commonly used in the ceramics industry, in order to extract further moisture from the still moist raw mixture produced from an aqueous bulk suspension of the starting materials, also known as slip, by filtering, pulling or extruding processes, in order to achieve the necessary properties with regard to plasticity and stability for a subsequent shaping operation, for example by turning on a lathe.

BACKGROUND OF THE INVENTION

The method for electrically predrying a blank of a ceramic raw mixture is known per se and is used in particular in the production of porcelain insulators of a wide variety of dimensions, in order to bring the clot that is obtained after the extrusion in the form of a clay column to the reduced residual moisture that is necessary for a subsequent shaping operation by turning on a lathe. For this purpose, the still moist clot is connected as an electrical resistance into an alternating current circuit. The alternating current flowing through has the effect of heating up the clot, whereby water is driven out to the extent that the residual moisture necessary for the shaping operation is achieved. After the electrical predrying, the cylindrical clot, which may have a length of several meters and a diameter of over 50 cm, is further processed by turning on a lathe for shaping the inner and outer contours.

In comparison with air drying, electrical predrying significantly reduces the time for drying the clots to the state in which they are ready for turning on a lathe. The reduced time that the clots spend in the drying process allows the overall production throughput to be increased. However, a considerable amount of additional energy is required for the electrical predrying, and the aim is to reduce this further in the interests of cost-effectiveness and environmental protection.

SUMMARY OF THE INVENTION

The object of the present invention is to further improve the method for electrically predrying a blank of a ceramic raw mixture with regard to the energy demand.

According to the invention, this object is achieved for a method for electrical predrying of the type mentioned at the beginning by the alternating current that is used for the drying being passed through the blank at an increased frequency in comparison with the mains frequency. For this purpose, an a.c. voltage of increased frequency is in particular applied to the blank.

DETAILED DESCRIPTION

The invention is based in a first step on the finding surprisingly obtained in our own tests that, in the drying of clots by means of alternating current, with the same voltage the current consumption, or the alternating current flowing through the clot, falls when there is a changeover to higher frequencies as compared with the previously customary mains frequency, and does not rise as would be expected with a capacitive load. In a second step, further tests were carried out, demonstrating along with the reduced current consumption at higher frequencies also that the time for drying the clots until the moisture level for turning on a lathe is reached is additionally reduced by the higher frequencies. Thus, when the frequencies of the alternating current flowing through the clot are increased as compared with the mains frequency, a significant energy saving, which in individual cases is up to 30%, can surprisingly be achieved on account of the reduced current consumption with the same voltage and on account of the reduced drying times.

Presumed as a cause of this surprising and unexpected outcome is the so-called skin effect, which limits the internal current density in cylindrical conductors flowed through with alternating current and concentrates the current flow on the periphery or a surface layer. The skin effect occurs in thick conductors that have a large diameter in comparison with the thickness of the conducting surface layer, as is the case with still moist cylindrical clay columns of the ceramic raw mixture.

As a result of the cumulative eddy currents inside the electrical conductor, the skin effect leads to a displacement of the current to the periphery, the current density falling exponentially from the periphery of the conductor inwards. On account of the skin effect, a reduction of the effective conductor cross section occurs. The impedance of the conductor increases with increasing frequency.

In particular, the reduction in the current consumption that is observed with increasing frequency in the case of clot drying can be explained by the skin effect. And indeed, the surprising reduction of the drying time that has been observed can also be explained by the skin effect. At a low frequency such as a mains frequency of for example 50 Hz, the skin effect in the case of the still moist ceramic raw mixture tends to be negligible. Consequently, a not inconsiderable part of the alternating current also flows in the interior of the ceramic raw mixture to be dried. Since, however, the raw mixture is moistened uniformly throughout, the electrical power introduced in the interior does not lead to expulsion of the unbound water, since it cannot get to the outside because of the "surrounding water". Consequently, although a not inconsiderable part of the electrical power introduced will lead to a heating effect, it will not lead to water being expelled. On the other hand, the situation is different if the skin effect pertains. In this case, the current flow tends to be confined to the periphery of the blank flowed through. The electrical power introduced at the periphery can consequently be used directly for expelling water. The expulsion of water then occurring at the periphery has the effect of reducing the electrical conductivity there, so that the skin layer in which the alternating electrical current flows migrates from the outside inwards in the course of the drying time. In other words, when drying the clot with the skin effect pertaining, the electrical power is introduced precisely where unbound water can escape to the outside. The proportion of electrical power unused for water expulsion is reduced. The drying time is reduced.

It has consequently been surprisingly found overall that the electrical energy consumption for drying clots to the state in which they are ready for turning on a lathe can be reduced considerably when there is a changeover of the frequency of the alternating current used for the electrical predrying from a mains frequency to higher frequencies, that is to say frequencies greater than 60 Hz. To be able to use a higher frequency, preferably a suitable converter is used, connected to the general power mains on the input side and supplying the as-desired increased frequency on the output side.

The alternating current is preferably passed through the blank at a frequency of greater than 100 Hz. Our own investigations indicate that, with respect to a mains frequency typically used in this country of 50 Hz, an economically relevant energy saving is obtained when there is a changeover to frequencies of over 100 Hz.

More preferably, the alternating current is passed through the blank at a frequency of between 300 Hz and 1000 Hz. In this range, a significant energy saving of between 10% and 30% has been observed as compared with alternating-current drying at a frequency of 50 Hz.

In an advantageous configurational variant, an extruded clay column of the raw mixture of a ceramic insulator is predried as the blank. However, the invention can also be transferred without any problem to other ceramic blanks. The extruded clay column or clot is in particular a blank for a porcelain insulator, and accordingly comprises a composition of various minerals, in particular of kaolin, feldspar and alumina. The clot is in particular a solid-core clot, the introduction of the inner contour taking place after the electrical predrying.

The moisture levels contained in the ceramic blank after the extrusion process depend on the clay minerals specifically used and on the production process as such. The required moisture levels for turning on a lathe also vary for different types and compositions and are also based in particular on empirical values of the respective manufacturer. In the case of clot drying, the electrical predrying of the still moist blank is preferably performed from an initial moisture content of between 18% and 21% to a moisture content when ready for turning on a lathe of between 15% and 17%. The percentages given relate here to the respective proportions by weight of water in relation to the total weight.

The predrying is expediently performed under temperature control. For this purpose, for example, the temperature of the blank may be continuously measured during the drying operation and controlled to a prescribed setpoint value by controlling the voltage applied. Furthermore, a maximum value may be prescribed, on reaching which the circuit for drying the blank is interrupted. On reaching a minimum value, the circuit is closed again. The latter method is recommendable for reasons of cost, since it requires comparatively simple sensors and controllers, such as for example a two-position controller.

A value of between 35° C. and 45° C. is preferably chosen as the maximum temperature of the predrying and a value of between 25° C. and 35° C. is preferably chosen for the minimum temperature. In this case, the individual values are prescribed such that the value of the minimum temperature is always less than the value of the maximum temperature.

For connecting the ceramic blank into the circuit, more preferably a metallic mat is applied to the end faces of the blank, so that the introduction of current takes place over a surface area. The metallic mat may be, for example, a copper mesh or an aluminium foil.

In a variant, multiple ceramic blanks are connected in series into the circuit. In the case of a three-phase mains system, multiple ceramic blanks may also be respectively connected in series and respectively connected between two phases of the three-phase system.

For electrical predrying that is uniform and avoids the risk of drying out, the blank is subjected to an alternating voltage of between 300 V and 500 V. At these voltage values, typical current intensities of several 10 A are obtained in the drying of clots. Experience shows that this allows the best predrying results to be achieved.

The invention is described further on the basis of several exemplary embodiments.

Example 1

For a total of four types of porcelain insulator of the same composition but varying with regard to their length and with regard to their diameter, drying of the solid-core clots is carried out in each case by applying an alternating voltage of 400 V at a frequency of 50 Hz and at a frequency of 650 Hz. The still moist clots after the extruding or pulling operation have a moisture level of 20%. The electrical predrying is in each case carried out to a moisture level of 16.5%. The residual moisture content is checked by means of a penetrometer. The drying times of the 50 Hz drying and the 650 Hz drying are compared with one another. In the case of the 650 Hz drying, reductions of the drying times of between 40% and 65% are obtained for the various types of clot.

Example 2

Identically produced solid-core clots with a length of 2340 mm and a diameter 320 mm are connected to an alternating voltage of 400 V for the electrical predrying. During a drying time of approximately one day, with the temperature controlled to a setpoint temperature of 40° C., the current intensity of the alternating current flowing through is checked and used to determine the energy consumption. At the same time, the resultant residual moisture is observed. The electrical predrying is carried out at a frequency of 50 Hz and at a frequency of 650 Hz.

In the case of the electrical predrying at 50 Hz, an average current intensity of 14.45 A is observed. The average current intensity in the case of the electrical predrying at 650 Hz is 12.60 A. At the end of the running time, the residual moisture of the clot in the case of the electrical predrying at 650 Hz of 15.67% is lower by approximately 1% than the residual moisture of 16.58% of the clot that was dried at 50 Hz. With the same dwell time, altogether 129.8 kWh were required for the 50 Hz drying as compared with 106.8 kWh in the case of the 650 Hz drying. Consequently, 23 kWh less were required for the electrical predrying at 650 Hz. This is equivalent to an energy saving of 18%, without taking into account the further reducing drying time at 650 Hz as a result of more rapid drying.

Example 3

The method according to Example 2 is repeated a number of times for solid-core clots of article number 12302 of a different length and a different diameter. The average energy consumption of the electrical predrying at 50 Hz and the electrical predrying at 650 Hz are compared with one another. A reduction of the energy demand of 30% is obtained in the case of the electrical predrying at 650 Hz.

Example 4

For the full-core clots corresponding to Example 3, the frequency is changed over at various times during the electrical predrying between the frequencies of 50 Hz, 325 Hz and 650 Hz. The voltage applied was in each case 400 V. The respective current intensity is observed.

In the case of the electrical predrying at 50 Hz, the current intensity increases from 36 A for an initial moisture content of 20% to a current intensity of 45 A for a residual moisture of 16.8%. In the case of the electrical predrying at 325 Hz, the current intensity increases from 35 A for the initial moisture level to a current intensity of 43 A for the residual moisture level. In the case of the electrical predrying at 650 Hz, the current intensity increases from 30 A for the initial moisture level to a current intensity of 37 A for the residual moisture level.

It is evident that the current intensity falls with increasing frequency on account of the skin effect. Since the drying times likewise fall with increasing frequency, a considerable reduction of the required energy demand is obtained.

The invention claimed is:

1. Method for electrically predrying a moist blank formed of a ceramic raw mixture, comprising:
    coupling a moist blank of ceramic material to a circuit; and
    applying an alternating current through the blank at a frequency sufficiently high that a current density of alternating current flowing through the blank is concentrated in a moist skin layer of the blank during the applying,
    wherein the skin layer within which current flow is concentrated during the applying migrates from an outer periphery of the blank inwardly as moisture is expelled outwardly of the blank.

2. The method according to claim 1, wherein the alternating current is passed through the blank at a frequency of between 300 Hz and 1000 Hz during the applying.

3. The method according to claim 2, wherein the coupling comprises connecting, to the circuit, an extruded clay column of raw mixture of a ceramic insulator.

4. The method according to claim 3, wherein the extruded clay column has a solid-core.

5. The method according to claim 2, wherein the applying is performed on a moist blank having an initial moisture content of between 18% and 21% and discontinued at a moisture content of between 15% and 17%.

6. The method according to claim 2, further comprising
    sensing a temperature of the blank during the applying; and
    controlling a flow of current through the blank based on temperature, wherein the flow of current is interrupted when a maximum temperature is reached and resumed at a second temperature below the maximum temperature.

7. The method according to claim 6, wherein the maximum temperature is between 35° C. and 45° C. and the second temperature is between 25° C. and 35° C.

8. The method according to claim 2, wherein the coupling comprises connecting a metallic mat to end faces of the blank.

9. The method according to claim 2, wherein the blank is subjected to an alternating voltage of between 300 V and 500 V during the applying.

10. The method according to claim 2, further including increasing the frequency of the alternating current during the applying.

11. The method according to claim 1, wherein electrical predrying is performed from a moisture content of the blank of between 18% and 21% to a moisture content of the blank of between 15% and 17%.

12. The method according to claim 1, wherein predrying is performed under temperature control during the applying, in that a maximum_temperature of the blank is sensed during the drying and current flow is interrupted on reaching a maximum temperature and is switched on upon reaching a minimum temperature.

13. The method according to claim 12, wherein the maximum temperature is chosen with a value of between 35° C. and 45° C. and the minimum temperature is chosen with a value of between 25° C. and 35° C.

14. The method according to claim 1, wherein the frequency is at least 100 Hz and the applying is performed by a metallic mat coupled to end faces of the blank.

15. The method according to 1, wherein the blank is subjected to an alternating voltage of between 300 V and 500 V during the applying.

16. The method according to claim 1, further comprising operating a converter to increase the frequency of the alternating current during the applying.

17. Method for electrically predrying a moist blank of a ceramic raw mixture, comprising:
    connecting the blank into a circuit; and
    passing alternating current through the blank such that a current density of the alternating current is concentrated, by skin effect, within a moist skin layer of the blank,
    wherein the moist skin layer where alternating current is concenrated migrates from an outer periphery of the blank inwardly as moisture is expelled to the outside of the blank during the applying, and
    wherein the alternating current is passed through the blank at a frequency of between 300 Hz and 1000 Hz.

18. The method of claim 17, wherein application of alternating current to the circuit begins when the blank has a moisture content of between 18% and 21% and terminates when the alternating current has a moisture content of between 15% and 17%.

19. The method of claim 17, further comprising
    monitoring a temperature of the blank during application of the alternating current;
    passing the alternating current through the blank to maintain at least a minimum temperature; and
    interrupting passing of alternating current to the blank upon reaching a maximum temperature.

20. The method of claim 19, wherein the maximum temperature is between 35° C. and 45° C. and wherein the minimum temperature is between 25° C. and 35° C.

* * * * *